March 25, 1947.                    C. W. EARP                    2,417,815
                              RADIO DISTANCE METER
                              Filed Sept. 11, 1942
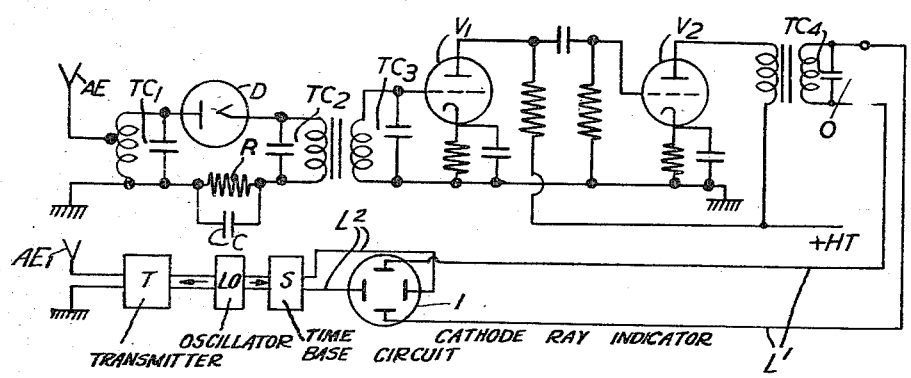
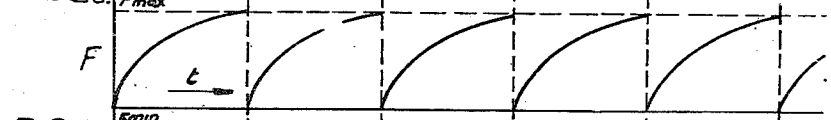
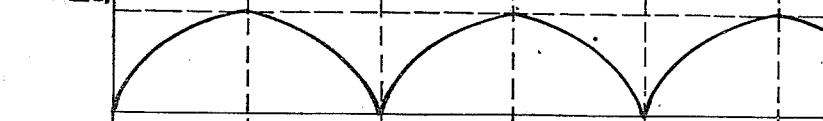
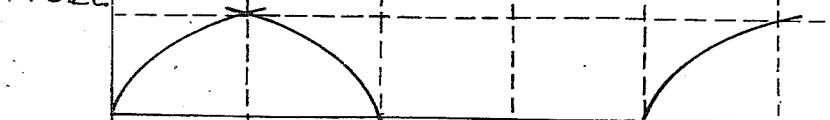
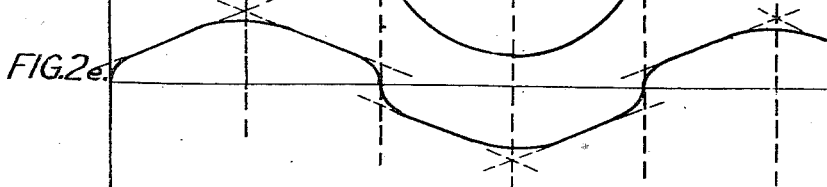
INVENTOR
C. W. Earp
BY Loyd Hall Sutton
ATTORNEY Patented Mar. 25, 1947

2,417,815

UNITED STATES PATENT OFFICE 2,417,815

RADIO DISTANCE METER

Charles William Earp, London W. C. 2, England, assignor to Standard Telephones and Cables Limited, London, England, a British company Application September 11, 1942, Serial No. 458,056
In Great Britain March 15, 1940

5 Claims. (Cl. 250—1)

This invention relates to radio apparatus for the measurement of distance.

In a known type of radio altimeter, frequency modulation of the transmitter is linear with time, for example at 60 cycles/sec. A signal received on a receiver located at or near the transmitter, after reflection from an object differs in frequency from the signal transmitted contemporaneously with the reception of the reflected signal and the beat frequency between the said contemporaneously received reflected signal and transmitted signal gives an indication of distance.

A system has also been proposed in which the spectrum of beat notes produced by multiple reflections are analysed by a receiver, the tuning element of which scans the whole range of beat frequencies which could be received; in cyclical synchronism with the horizontal time base of a cathode ray oscillograph. The vertical deflection of the oscillograph is produced by the output of the scanning receiver.

It has been found that the scanning type of receiver is unnecessary if the wave-form representing frequency against time or frequency sweep of the transmitter is suitably modified.

The time $t$ taken by an electro-magnetic wave to travel from the transmitter to a reflecting object at a distance $d$ from the transmitter and after reflection back to a receiver located at the transmitter is given by:

$$t = \frac{2d}{V}$$

where V is the velocity of propagation of electro-magnetic waves, namely the velocity of light.

When the transmitted wave is continuously varied or swept in frequency at the rate of $n$ cycles per second the instantaneous beat frequency $f$ between the contemporaneous transmitted wave or the wave received at the receiver directly from the transmitter and the wave received after reflection from the reflecting object is given by $$f = \frac{2n.d}{V}$$

cycles per second.

From this it is seen that the beat frequency $f$ is proportional to the distance of the reflecting object and also to the rate of change of frequency ($n$ cycles per second) at the transmitter.

In the known type of radio altimeter mentioned hereinbefore, $n$ is made constant by the linear frequency modulation at the transmitter, and consequently the beat frequency $f$ is proportional to the distance between the transmitter and the reflecting object. On the other hand, the beat frequency $f$ due to reflection from an object at a particular distance $d$ away is directly proportional to the rate of change of frequency at the transmitter.

According to the present invention the method of determining the distance between a reflecting object and a radio transmitting station comprises transmitting from said station electro-magnetic waves, the rate of change of frequency of which is varied cyclically over a range of frequencies, receiving at a receiver located at or near the transmitter waves directly from the transmitter and after reflection from said object to produce a beat frequency of predetermined value, the rate of change of frequency giving this said predetermined beat frequency value being a measure of the distance of the reflecting object from the receiver. By this means a wide range of distances of reflecting objects will in turn produce the same beat frequency.

Thus $$d = \frac{Vf}{2n}$$

and if $f$ is constant $d$ is inversely proportional to $n$.

From another aspect, the method of detecting objects by means of electro-magnetic waves and of measuring the distance between the respective objects and the transmitter of said waves, comprises cyclically varying the rate of change of frequency of the transmitted waves, receiving on a receiver located at or near the transmitter, waves directly from the transmitter and after reflection from said objects so that the reflection from each object produces during the cycle of varying rate of change of frequency, a predetermined beat frequency which indicates the presence of the object and the rate of change of frequency producing said beat frequency being a measure of the distance between the particular reflecting object and the transmitter.

Apparatus for carrying out the method in practice comprises a selective receiver which responds to one particular constant beat frequency. In combination with the transmitter whose rate of change of frequency is varied cyclically, the selective receiver will, in effect, scan the whole of the possible reflection signals in synchronism with the cycle of frequency modulation of the transmitter.

From another aspect of the invention, the method of indication of the presence of or the distance of an object from an electro-magnetic wave transmitter in which the waves transmitted are cyclically modulated in frequency, a beat frequency being obtained at the transmitter located between the contemporaneously transmitted wave and the wave received after reflection from said object and applied to an indicating device to obtain an indication of the distance or presence of the object is characterised in this that a wave integrally related in period to the cycle of frequency modulation of the transmitter is employed for the operation of a visual indicator to which the beat frequency is applied.

The frequency of the waves sent out by the transmitter is varied over a definite cycle which can be defined by $F = f(t)$ so that the rate of change of frequency $$n = \frac{dF}{dt} = f'(t)$$

If, therefore, the time base of a cathode ray indicator is operated by a wave proportional to $f(t)$ or $f'(t)$ or in fact any wave which is synchronous in period, the position of the indicating spot along this time base is a function of $n$ and can therefore be calibrated to indicate $d$.

Output from the selective receiver which responds only to beat frequency $f$, will only be present at instants corresponding to $$n.d = \frac{1}{2} V.f.$$

If this output is applied to the Y deflecting elements of the cathode ray tube oscillograph to the X deflecting elements of which the time base wave referred to above is applied, a deflection of the indicating spot on the indicating screen will result only at the positions along the time base or X direction which corresponds to the distances of reflecting obstacles. It will be observed that if the time base and the rate of change of frequency variation of the modulator are each linear with time, the scale of distances on the oscillograph screen will also be linear.

At the transmitter, modulation may be carried out electrically, by means of a low frequency oscillator of suitable wave form, for example by feeding the output from the oscillator to vary in known manner the bias of a frequency controlling valve, the latter operating by virtue of the well known "Miller" effect, or mechanically by means of a variable condenser which forms part of the oscillatory tuned circuit, determining the frequency transmitted. Modulation of the frequency of the transmitter by mechanical means is preferable and the most advantageous, for the extent of the frequency excursions are more positively defined and measured, and furthermore almost any desired wave form representing the frequency change with time can be achieved by suitable shaping of the condenser vanes.

In one practical embodiment of the invention the apparatus required for complete visual indication of the distance from one or a number of obstacles is the following:

1. An ultra-high frequency transmitter, the frequency modulating condenser of which is cut to give a continuously varying rate of change of frequency or frequency/time slope, or the frequency of which is cyclically varied by a low frequency oscillator.

2. A receiver consisting of a diode detector and a tuned L. F. amplifier (tuned say to 1000 cycles).

3. A cathode ray oscillograph indicator, the horizontal deflector plates of which are fed by a potential wave having the same wave form as the frequency/time curve of the transmitter, or a wave form derived from and synchronised to this, and the vertical plates of which are fed by the output from the receiver. In some cases, hereinafter explained, it may be desirable to operate the oscillograph base with a wave of half the period of the transmitter modulation, in order to prevent double indication.

The cyclic variation of the transmitter frequency should preferably be about 10 cycles/second or lower, in order that a highly selective receiver may be excited.

The accompanying drawings show, by way of example, in Fig. 1, the circuit diagram of an obstacle detecting system according to the invention, and in Fig. 2a–2e various wave forms for the modulation of the transmitter.

Referring to Fig. 1, AE1 is a transmitting aerial energized by an ultra short wave transmitter T the frequency of which is cyclically varied by a low frequency oscillator LO of suitable wave form. The receiving aerial is indicated at AE, tuned to the ultra short waves by a circuit TC1 which feeds into a diode detector D. The output circuit of D comprises a tuned circuit TC2 which operates at the desired beat frequency $f$, for example, 1000 cycles per second and a resistance R capacity C combination, which produces the correct operating bias for the diode. A circuit TC3 which also gives further filtering at 1000 cycles is coupled to TC2, and the output from TC3 is fed to two amplifiers V1, V2, the output of which is passed through a further tuned circuit TC4 which feeds the beat frequency of 1000 cycles (for example) over the leads L1 to the Y deflecting plates of the cathode ray oscillograph indicator I. The thermionic amplifiers V1 and V2 are supplied with high tension voltage from the HT+ terminal as shown, and are provided with other auxiliary components for the proper functioning thereof in a manner well known to those versed in the art and need not, therefore, be described herein in detail. A potential wave having the same wave form as the frequency/time curve of the transmitter is fed over the leads L2 to the X plates of the indicator I from a time base circuit S to which are applied waves from the oscillator LO which may be modulated in frequency by means of a variable condenser forming part of the oscillatory tuned circuit.

Referring now to Figs. 2a–2e of the drawings, Fig. 2a shows the wave-form of the frequency variation between limits $F_{min}$ and $F_{max}$ and having a continuously varying slope $$\frac{dF}{dt} = n$$

It may be noted that $n_{max}$ corresponds to $F_{min}$ which corresponds to the shortest distance which can be measured on the oscillograph, similarly the longest distance which can be measured corresponds to $F_{max}$ which corresponds to $n_{min}$. If now, the time base of the oscillograph is operated by this modulating wave, or a wave derived from it, the distances of all reflecting objects with the limits imposed by the maximum and minimum values of $n$, will be indicated.

The wave form shown in Fig. 2a is however not very practical for frequency modulation by mechanical means, owing to the sharp change of frequency required once during each cycle. This instantaneous fly-back is avoided in the curve form shown in 2b. In this case, the linear distance scale is obtained as before, by making the rate of change of frequency variation with time, or the change of the slope of the curve with time, constant. The wave-form applied to the time-base of the oscillograph is symmetrical in that the indicating spot travels in each direction at the same velocity.

The effect of applying a sine-wave to the indicator time-base is to produce a "crowded" scale at both the maximum and minimum distance, but this non-linear scale may be positively calibrated.

Fig. 2c shows a still more practical modulating wave for modulation by mechanical means. In this case, however, if the time-base wave is of the same period as the modulating wave, a double indication of distance will be obtained. Maximum distance will be indicated at both ends of the scale, and minimum distance in the centre. If desired, however, the double indication may be avoided by applying a wave of half the period (e. g. Fig. 2b) to the time-base.

Fig. 2d shows a "semi-circular" frequency modulating wave-form which can be used for indication of all distances from zero to infinity.

Fig. 2e shows a modulating wave of almost constant slope over a considerable portion of the cycle. This will have the effect of improving receiver response and signal-to-noise ratio for reflections from a particular distance.

Other possible wave-forms will readily occur to those skilled in the art, and can be designed according to particular requirements. For instance the range between two predetermined distances may be magnified as described, either by shaping of the modulating wave or the indicator time-base. Furthermore if it is required to examine a particular distance, the modulation may be arranged to give a corresponding rate of change of frequency over a considerable portion of the modulation cycle, as for instance is shown in curve Fig. 2e. when an enlarged scale with no diminution in brightness of the screen will be obtained.

The most generally useful distance scales are the linear scale, and the logarithmic distance scale. It should be noticed that either of these may be derived from any of the modulating waves shown, by suitable shaping of the time-base wave. Alternatively, any form of the time-base may be used, providing that the synchronised modulating wave is shaped for the required result. It should be noticed, however, that the shape of the frequency modulating wave determines the character of the signals in the receiver and hence the signal-to-noise ratios obtainable, corresponding to obstacles at particular distances.

It will be observed that if directive transmission and reception of the electro-magnetic waves be utilised the exact location of the reflecting object may be obtained.

What is claimed is:

1. System for determining the distance of an object by electromagnetic waves comprising a transmitter including means for cyclically varying the frequency of the generated waves and for varying the rate of change of frequency over the range of frequency sweep, a receiver arranged to receive waves directly from said transmitter and waves reflected from an object, means for intermodulating said directly received and reflected waves to produce beat frequency waves, means for selecting beat frequency waves having a predetermined frequency, a visual distance indicator, means for applying to said indicator said last-mentioned beat frequency waves, means for producing a time base wave integrally related to the cycle of frequency modulation of said transmitter and means for applying said time base wave to said indicator.

2. System for determining the distance of an object by electromagnetic waves comprising a transmitter including means for cyclically varying the frequency of the generated high frequency waves with a rate of change which varies over the range of frequency sweep, a receiver arranged to receive waves directly from said transmitter and waves reflected from an object, means for intermodulating said directly received and reflected waves to produce beat frequency waves, means for selecting beat frequency waves having a predetermined frequency, a cathode ray oscillograph indicator having horizontal and vertical deflecting elements, means for applying said predetermined frequency beat waves to said vertical deflecting elements, means for producing time base waves integrally related to the cycle of frequency modulation of said transmitter, and means for applying said time base waves to said horizontal deflecting elements.

3. System for determining the distance of an object by electromagnetic waves according to claim 2, wherein said intermodulating means comprises a diode detector including an output circuit, said output circuit being tuned to said predetermined beat frequency.

4. System for determining the distance of an object by electromagnetic waves according to claim 2, wherein said intermodulating means comprises a diode detector including an output circuit and wherein the output of said diode is coupled to at least one stage of amplification including a circuit tuned to said predetermined beat frequency.

5. The method of determining the distance between a reflecting object and a radio transmitting station which comprises transmitting electromagnetic waves cyclically modulated in frequency the rate of change of frequency being varied over the range of frequency sweep, receiving directly transmitted waves and waves reflected from said object, intermodulating said waves to produce beat frequency waves, selecting a predetermined beat frequency wave, producing a voltage integrally related in period to the cycle of frequency modulation of said transmitted waves and obtaining an indication of distance by determining the occurrence of said selected beat frequency wave relative to said voltage.

CHARLES WILLIAM EARP.

REFERENCES CITED

The following references are of record in the file of this patent:

UNITED STATES PATENTS

| Number | Name | Date |
| --- | --- | --- |
| 2,011,392 | Bentley | Aug. 13, 1935 |
| 2,222,586 | Sanders, Jr. | Nov. 19, 1940 |
| 2,248,599 | Alexanderson | July 8, 1941 |
| 2,256,539 | Alford | Sept. 23, 1941 |
| 2,268,587 | Guanella | Jan. 6, 1942 |